US009829257B2

United States Patent
Oohigashi

(10) Patent No.: US 9,829,257 B2
(45) Date of Patent: Nov. 28, 2017

(54) HEAT EXCHANGER AND WATER HEATER

(71) Applicant: NORITZ CORPORATION, Hyogo (JP)

(72) Inventor: Takeshi Oohigashi, Kakogawa (JP)

(73) Assignee: NORITZ CORPORATION, Hyogo (JP)

( * ) Notice: Subject to any disclaimer, the term of this patent is extended or adjusted under 35 U.S.C. 154(b) by 196 days.

(21) Appl. No.: 14/099,563

(22) Filed: Dec. 6, 2013

(65) Prior Publication Data
US 2014/0190425 A1  Jul. 10, 2014

(30) Foreign Application Priority Data
Jan. 10, 2013  (JP) .................................. 2013-002634

(51) Int. Cl.
*F24H 1/14* (2006.01)
*F28F 1/24* (2006.01)
(Continued)

(52) U.S. Cl.
CPC ................. *F28F 1/24* (2013.01); *F24H 1/43* (2013.01); *F24H 8/006* (2013.01); *F24H 9/0031* (2013.01);
(Continued)

(58) Field of Classification Search
CPC ... F28D 1/0477; F28F 1/24; F28F 1/30; F28F 1/32; F28F 1/325; F24H 9/00
(Continued)

(56) References Cited

U.S. PATENT DOCUMENTS 3,994,336 A  *  11/1976  Pessolano ................. F24H 6/00
                                                            122/33
5,685,367 A       11/1997  Jun
                    (Continued)

FOREIGN PATENT DOCUMENTS

CN       1137110 A       12/1996
JP    S54-159256 U       11/1979
              (Continued)

OTHER PUBLICATIONS

The extended European search report issued by the European Patent Office dated Nov. 12, 2014, which corresponds to European Patent Application No. 13196068.4-1605 and is related to U.S. Appl. No. 14/099,563.
(Continued)

*Primary Examiner* — Steven B McAllister
*Assistant Examiner* — Ko-Wei Lin
(74) *Attorney, Agent, or Firm* — Studebaker & Brackett PC

(57) ABSTRACT

A fin includes a cut and raised slit and a cut and raised wall portion. The cut and raised slit is formed in a region adjacent to at least one through hole of a plurality of through holes in a first direction and has a tunnel-shaped hole extending in a second direction intersecting the first direction. The cut and raised wall portion is located in the second direction of the cut and raised slit, protrudes toward a main surface of the fin, and extends along the first direction. Thus, a heat exchanger and a water heater capable of sufficiently conducting an amount of heat of a combustion gas to a heat conduction pipe even in a blind spot of a flow of the combustion gas of the heat conduction pipe and suppressing noise can be realized.

15 Claims, 10 Drawing Sheets

(51) Int. Cl.

| | |
|---|---|
| *F28D 1/047* | (2006.01) |
| *F24H 9/00* | (2006.01) |
| *F28F 1/32* | (2006.01) |
| *F24H 1/43* | (2006.01) |
| *F24H 8/00* | (2006.01) |

(52) U.S. Cl.
CPC ............ *F28D 1/0477* (2013.01); *F28F 1/325* (2013.01); *Y02B 30/106* (2013.01)

(58) Field of Classification Search
USPC ......... 122/15.1, 18.1, 32, 33, 31.1; 165/151, 165/181
See application file for complete search history.

(56) References Cited

U.S. PATENT DOCUMENTS

| | | | |
|---|---|---|---|
| 5,848,638 A | 12/1998 | Kim | |
| 2007/0151716 A1* | 7/2007 | Lee | F28F 17/005 165/151 |
| 2011/0155079 A1* | 6/2011 | Matsunaga | F24H 1/40 122/15.1 |
| 2012/0175101 A1* | 7/2012 | Tamura | F24F 1/18 165/181 |

FOREIGN PATENT DOCUMENTS

| | | | | |
|---|---|---|---|---|
| JP | 60082783 A | * | 5/1985 | ............ F28F 1/325 |
| JP | S60-082783 A | | 5/1985 | |
| JP | 61-055595 A | | 3/1986 | |
| JP | H09-152288 A | | 6/1997 | |
| JP | H09-189493 A | | 7/1997 | |
| JP | 2000-227294 A | | 8/2000 | |
| JP | 2000-329486 A | | 11/2000 | |
| JP | 2002-228266 A | | 8/2002 | |
| JP | 2003-083618 A | | 3/2003 | |
| JP | 2004-077021 A | | 3/2004 | |
| JP | 2007-309533 A | | 11/2007 | |

OTHER PUBLICATIONS

The first Office Action; "Grounds for Rejection," issued by the Chinese Patent Office dated Jun. 18, 2015, which corresponds to Chinese Patent Application No. 201310670673.3 and is related to U.S. Appl. No. 14/099,563.

Communication pursuant to Article 94(3) EPC, issued by the European Patent Office dated Feb. 18, 2016, which corresponds to European Patent Application No. 013196068.4-1605 and is related to U.S. Appl. No. 14/099,563.

An Office Action; "Notice of Grounds of Rejection," issued by the Japanese Patent Office dated Sep. 27, 2016, which corresponds to Japanese Patent Application No. 2013-002634 and is related to U.S. Appl. No. 14/099,563; with English language translation.

* cited by examiner

DRAIN GAS    HOT WATER    INCOMING
             DELIVERY     WATER

HEAT EXCHANGER AND WATER HEATER

BACKGROUND OF THE INVENTION

Field of the Invention

The present invention relates to a heat exchanger and a water heater.

Description of the Background Art

A heat exchanger mainly has a plurality of plate-shaped fins, a heat conduction pipe passing through the fins, a water supply pipe and a hot water delivery pipe connected to the heat conduction pipe, and a shell plate serving as an exterior. A water heater has the heat exchanger above, a burner producing a combustion gas, and a blowing portion for supplying air for combustion to the burner.

Such a heat exchanger used for the water heater is disclosed, for example, in Japanese Patent Laying-Open No. 2000-227294, Japanese Patent Laying-Open No. 61-55595, and the like.

Japanese Patent Laying-Open No. 2000-227294 discloses a plate-shaped offset fin formed by cutting and raising from a fin. According to this publication, heat exchanger effectiveness can be improved by positioning an offset fin between two heat absorption pipes so that an amount of heat of an exhaust flow can be conducted to a blind side in a flow of the exhaust flow in the heat absorption pipe.

In addition, Japanese Patent Laying-Open No. 61-55595 discloses a cut and raised portion formed by opening a part of a fin and bending the same toward an upstream side. According to this publication, thermal conductivity in the rear of the cut and raised portion can be improved by a vortex created in an opening in the fin and a projection and recess at an upper edge of the cut and raised portion.

The heat exchanger described in Japanese Patent Laying-Open No. 2000-227294, however, cannot sufficiently conduct an amount of heat of a combustion gas to a heat conduction pipe in a blind spot of an exhaust flow (a flow of a combustion gas) of a heat absorption pipe (a heat conduction pipe).

In addition, when a cut and raised portion is provided orthogonal to a flow of the combustion gas as in Japanese Patent Laying-Open No. 61-55595, it becomes difficult for the combustion gas to pass through the heat exchanger and exhaust resistance of the combustion gas in the heat exchanger becomes high. Then, if the number of revolutions of a blowing portion is increased in order to send the combustion gas to the heat exchanger, noise caused by revolution becomes higher.

SUMMARY OF THE INVENTION

The present invention was made in view of the problems above, and an object thereof is to provide a heat exchanger and a water heater capable of sufficiently conducting an amount of heat of a combustion gas to a heat conduction pipe even in a blind spot of a flow of a combustion gas of a heat conduction pipe and suppressing noise.

A heat exchanger according to the present invention includes a plurality of fins and a heat conduction pipe. Each of the plurality of fins has a main surface and a plurality of through holes arranged as aligned along a first direction in the main surface, and the plurality of fins are arranged as stacked at a distance from one another. The heat conduction pipe passes through the plurality of through holes in each of the plurality of fins. At least one fin among the plurality of fins includes a cut and raised slit and a cut and raised wall portion. The cut and raised slit is formed in a region adjacent to at least one through hole of the plurality of through holes in the first direction and has a tunnel-shaped hole extending in a second direction intersecting the first direction. The cut and raised wall portion is located in the second direction of the cut and raised slit, protrudes toward the main surface of at least one fin, and extends along the first direction.

According to the heat exchanger of the present invention, the cut and raised wall portion extends along the first direction in which the plurality of through holes are arranged. Therefore, the cut and raised wall portion can divert a flow of the combustion gas which flows in the second direction to the first direction. Therefore, the flow of the combustion gas can be guided to a blind spot of the flow of the combustion gas of the heat conduction pipe, so that an amount of heat of the combustion gas can sufficiently be conducted to the heat conduction pipe also in that blind spot.

In addition, the cut and raised wall portion is located in the second direction of the cut and raised slit. Therefore, the combustion gas which flows in the second direction passes through the cut and raised slit before it reaches the cut and raised wall portion. This cut and raised slit has a tunnel-shaped hole extending in the second direction. Therefore, the combustion gas which flows in the second direction is split into a flow passing through the tunnel-shaped hole and colliding against a root portion of the cut and raised wall portion and a flow colliding against a tip end portion of the cut and raised wall portion without passing through the tunnel-shaped hole. Thus, the flow of the combustion gas colliding against a root side of the cut and raised wall portion can reliably be guided to the blind spot of the flow of the combustion gas of the heat conduction pipe. In addition, since the flow colliding against the tip end side of the cut and raised wall portion is likely to climb over the cut and raised wall portion, exhaust resistance of the combustion gas in the heat exchanger can be lowered. Since the need for increase in the number of revolutions of the blowing portion for supplying air for combustion is thus obviated, higher noise due to increase in the number of revolutions can also be suppressed.

In the heat exchanger above, the cut and raised slit and the cut and raised wall portion are arranged between an edge of the fin and the through hole located at an endmost portion of the plurality of through holes arranged as aligned in the first direction. Thus, since the flow of the combustion gas can be guided to the blind spot of the flow of the combustion gas of the heat conduction pipe also at the end portion of the heat exchanger where stagnation of the flow of the combustion gas is likely, stagnation of the combustion gas can be suppressed.

In the heat exchanger above, the cut and raised slit and the cut and raised wall portion are arranged between two through holes adjacent to each other among the plurality of through holes arranged as aligned in the first direction. Thus, the flow of the combustion gas can be guided to the blind spot of the heat conduction pipe also between two through holes adjacent to each other.

In the heat exchanger above, a height of the cut and raised wall portion from the main surface is greater than half a dimension of an interval between two fins adjacent to each other among the plurality of fins. Thus, the flow of the combustion gas colliding against the root side of the cut and raised wall portion can more reliably be guided to the blind spot of the flow of the combustion gas of the heat conduction pipe.

In the heat exchanger above, a length of extension of the cut and raised wall portion in the first direction is longer than a length of extension of the cut and raised slit in the first direction. Thus, the flow of the combustion gas which has passed through the cut and raised slit can reliably collide against the cut and raised wall portion.

In the heat exchanger above, the cut and raised wall portion is arranged to be displaced toward a downstream side in a direction of flow of a combustion gas from a virtual line connecting centers of the plurality of through holes arranged as aligned in the first direction. Thus, guide to the blind spot of the flow of the combustion gas of the heat conduction pipe can further be facilitated.

In the heat exchanger above, the plurality of through holes include a plurality of first-stage through holes and a plurality of second-stage through holes. The plurality of first-stage through holes are arranged as aligned in the first direction. The plurality of second-stage through holes are arranged as aligned in the first direction and arranged at a distance from the plurality of first-stage through holes in the second direction. A hole pitch between the plurality of first-stage through holes is smaller than a hole pitch between the plurality of second-stage through holes.

Since each of the plurality of first-stage through holes can thus be arranged as displaced in the first direction from each of the plurality of second-stage through holes, the combustion gas can efficiently be in contact with the heat conduction pipe which passes through each of the plurality of second-stage through holes.

A water heater according to the present invention includes any heat exchanger above and a combustion apparatus for producing a combustion gas to be provided to the heat exchanger.

According to the water heater of the present invention, an amount of heat of the combustion gas can sufficiently be conducted to the heat conduction pipe even in the blind spot of the flow of the combustion gas of the heat conduction pipe and noise can be suppressed.

The water heater further includes an exhaust collection and guide member covering the heat exchanger on a side opposite to a side where the combustion apparatus of the heat exchanger is arranged and having an outlet port. The cut and raised slit and the cut and raised wall portion are arranged between two through holes adjacent to each other in a region directly under the outlet port of the exhaust collection and guide member and the cut and raised slit and the cut and raised wall portion are not arranged between two through holes adjacent to each other in a region other than the region directly under the outlet port of the exhaust collection and guide member.

In particular in the region directly under the exhaust port of the exhaust collection and guide member, the combustion gas is less likely to flow into the blind spot of the flow of the combustion gas of the heat conduction pipe. Therefore, by selectively arranging the cut and raised slit and the cut and raised wall portion in that portion, the combustion gas can efficiently be guided to the blind spot of the flow of the combustion gas of the heat conduction pipe.

As described above, according to the present invention, an amount of heat of the combustion gas can sufficiently be conducted to the heat conduction pipe even in the blind spot of the heat conduction pipe and noise can be suppressed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

One embodiment of the present invention will be described hereinafter with reference to the drawings.

A construction of a water heater in the present embodiment will initially be described with reference to FIGS. 1 to 3.

Figure 1:
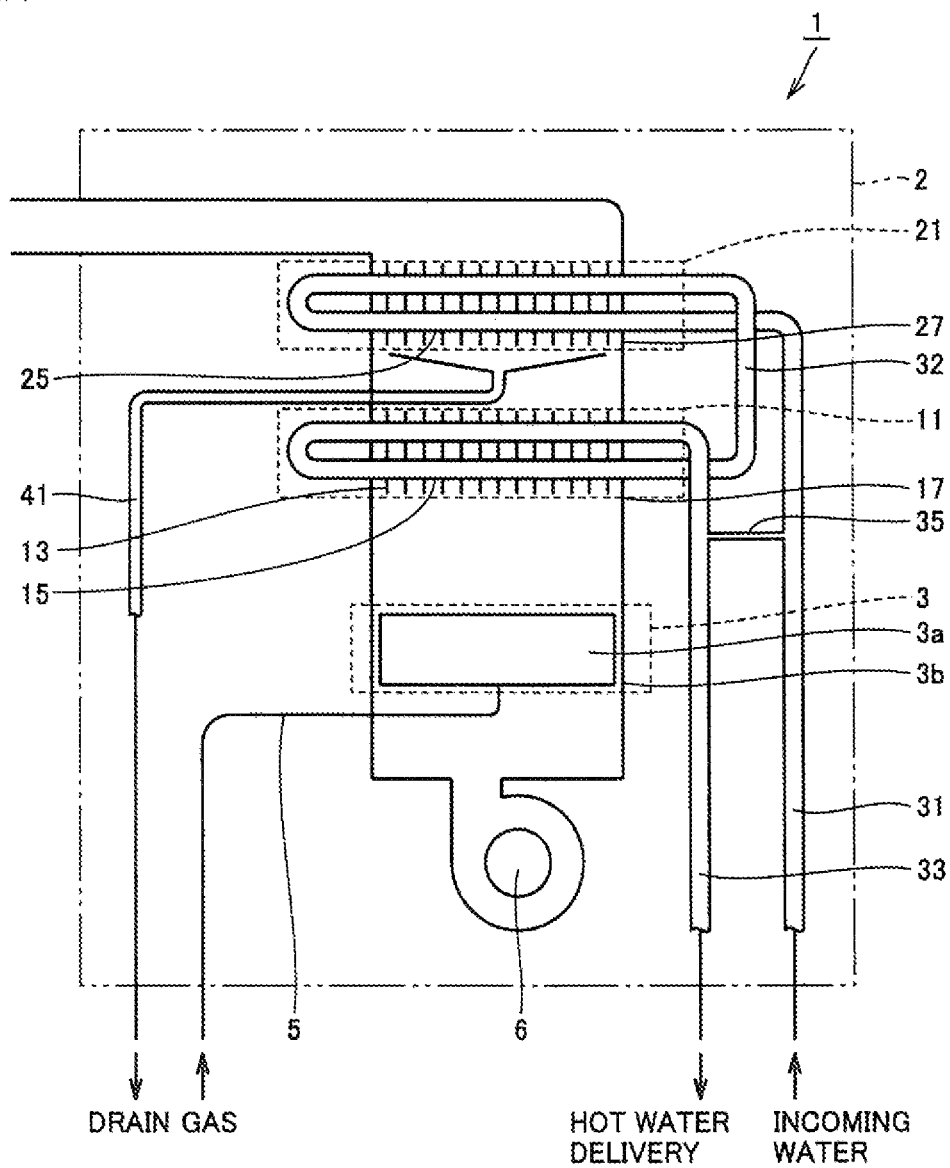
FIG. 1 is a schematic diagram showing a construction of a water heater in one embodiment of the present invention.
Figure 2:
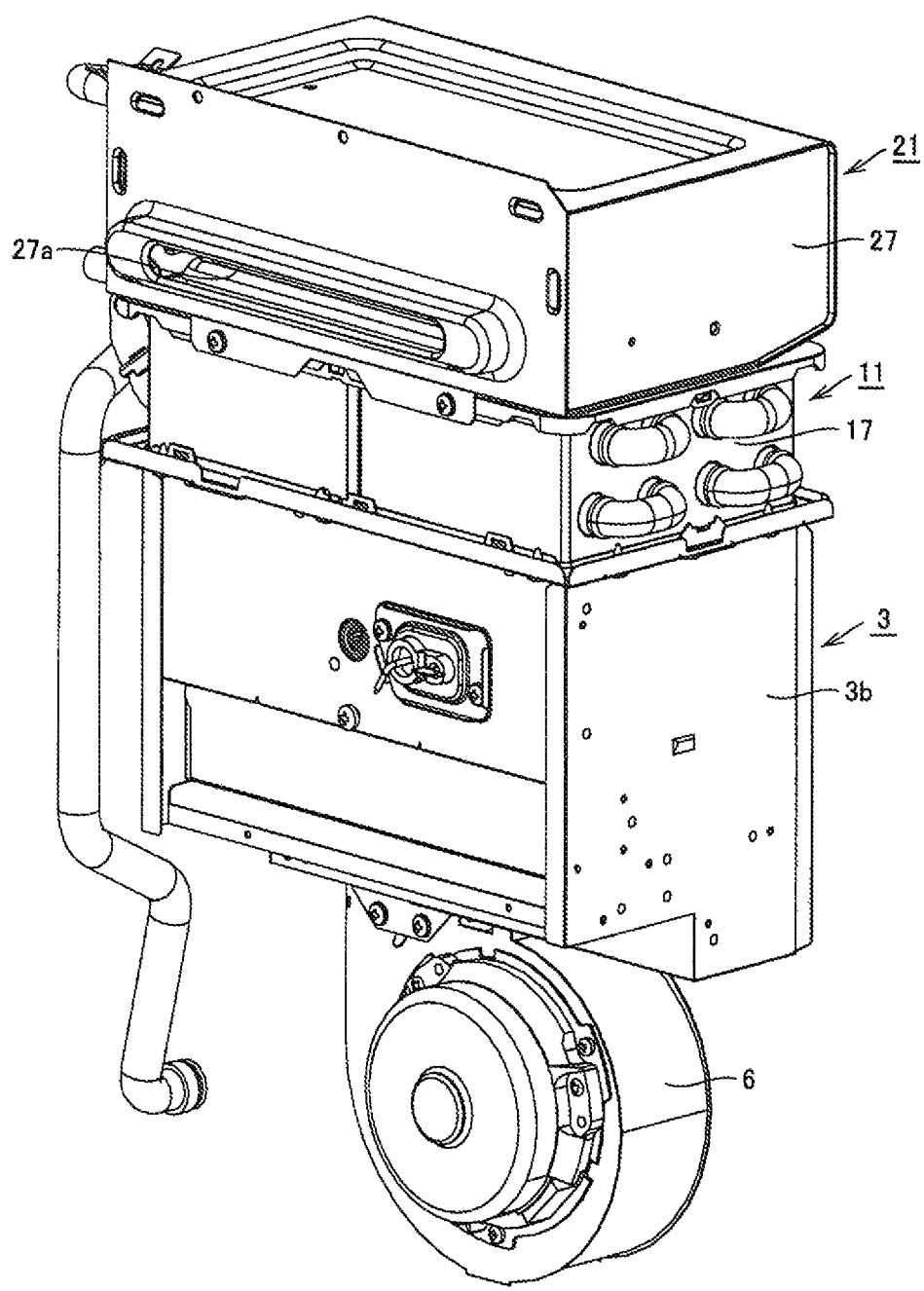
FIG. 2 is a perspective view showing a construction of a blowing portion, a combustion apparatus, a primary heat exchanger, and a secondary heat exchanger of the water heater in one embodiment of the present invention.

Referring to FIGS. 1 and 2, a water heater 1 in the present embodiment mainly has a housing 2, a combustion apparatus 3, a blowing portion 6, a primary heat exchanger 11, and a secondary heat exchanger 21. Combustion apparatus 3 serves to supply a combustion gas. This combustion apparatus 3 has a burner 3a and a burner case 3b, and burner 3a is accommodated in burner case 3b. A gas pipe 5 for supplying the combustion gas to combustion apparatus 3 is connected to this combustion apparatus 3.

Blowing portion 6 serves to supply air for combustion to combustion apparatus 3, and it has, for example, a fan, a fan case, a fan motor, and the like. This blowing portion 6 is attached to a lower portion of combustion apparatus 3.

Each of primary heat exchanger 11 and secondary heat exchanger 21 serves to exchange heat through the combustion gas supplied from combustion apparatus 3. Primary heat exchanger 11 is attached onto combustion apparatus 3 and secondary heat exchanger 21 is attached onto that primary heat exchanger 11.

A pipe 32 connects primary heat exchanger 11 and secondary heat exchanger 21 to each other. A water supply pipe 31 for supplying water to secondary heat exchanger 21 is connected to secondary heat exchanger 21. A hot water delivery pipe 33 for delivering hot water from primary heat exchanger 11 is connected to primary heat exchanger 11.

A bypass pipe 35 is connected between water supply pipe 31 and hot water delivery pipe 33 above. This bypass pipe 35 serves to adjust a temperature of hot water delivered through hot water delivery pipe 33 with water in water supply pipe 31. In addition, a drain exhaust pipe 41 for exhausting drain produced in secondary heat exchanger 21 is provided.

Figure 3:
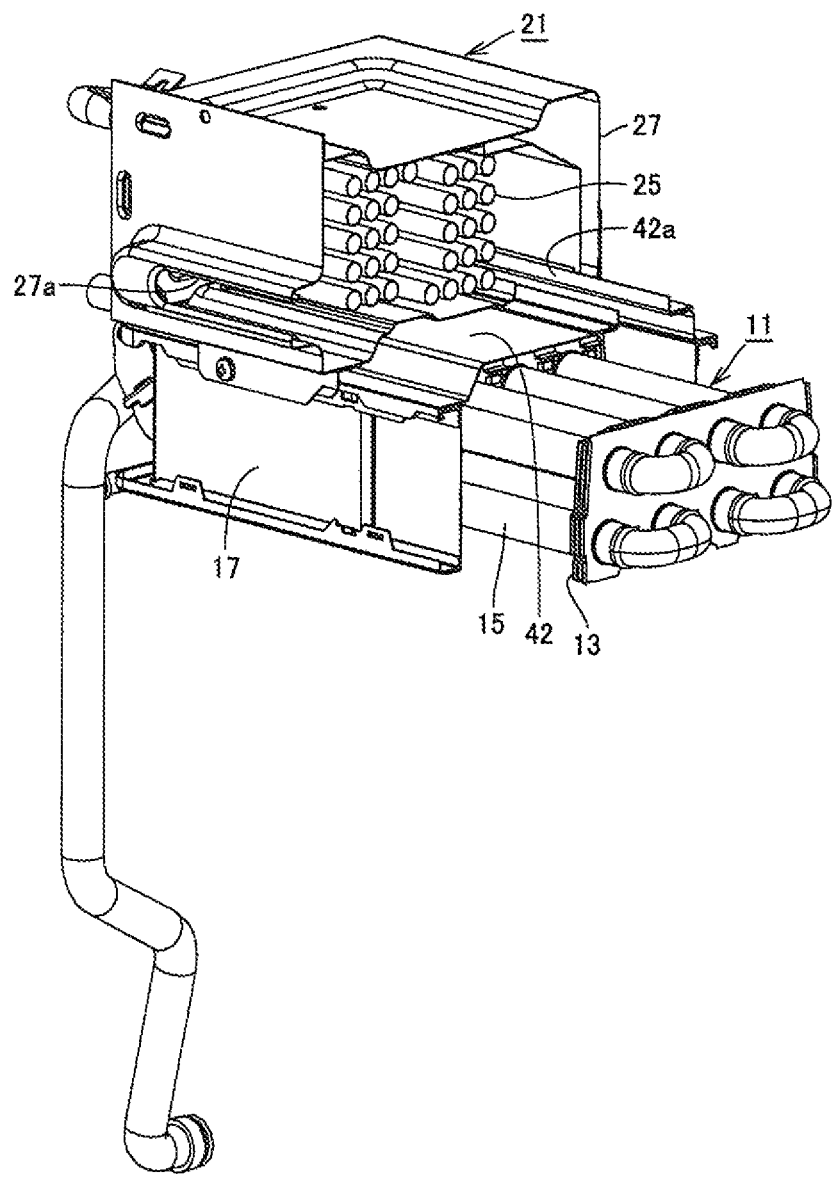
FIG. 3 is a partially exploded perspective view schematically showing a construction of the primary heat exchanger and the secondary heat exchanger of the water heater in one embodiment of the present invention.

Referring to FIGS. 1 and 3, primary heat exchanger 11 has a plurality of fins 13 stacked on one another, a heat conduction pipe 15 passing through the plurality of fins 13, and a shell plate 17 serving as a case accommodating therein the plurality of fins 13 and heat conduction pipe 15. Heat conduction pipe 15 is connected to pipe 32 at one end and connected to hot water delivery pipe 33 at the other end.

Secondary heat exchanger 21 has a plurality of (spiral) heat conduction pipes 25 and a case 27 for accommodating heat conduction pipe 25 therein. Heat conduction pipe 25 is connected to water supply pipe 31 at one end and connected to pipe 32 at the other end.

It is noted that the heat exchanger according to the present invention (claims) corresponds to primary heat exchanger 11, but not to secondary heat exchanger 21.

Referring to FIG. 3, an exhaust collection and guide member 42 is arranged between primary heat exchanger 11 and secondary heat exchanger 21. In this exhaust collection and guide member 42, an outlet port 42a for supplying the combustion gas which has passed through primary heat exchanger 11 to secondary heat exchanger 21 is formed. In addition, an exhaust port 27a for exhausting the combustion gas is provided in case 27 for secondary heat exchanger 21.

A construction of primary heat exchanger 11 above will now be described specifically with reference to FIGS. 4 to 7 and 12.

Figure 4:
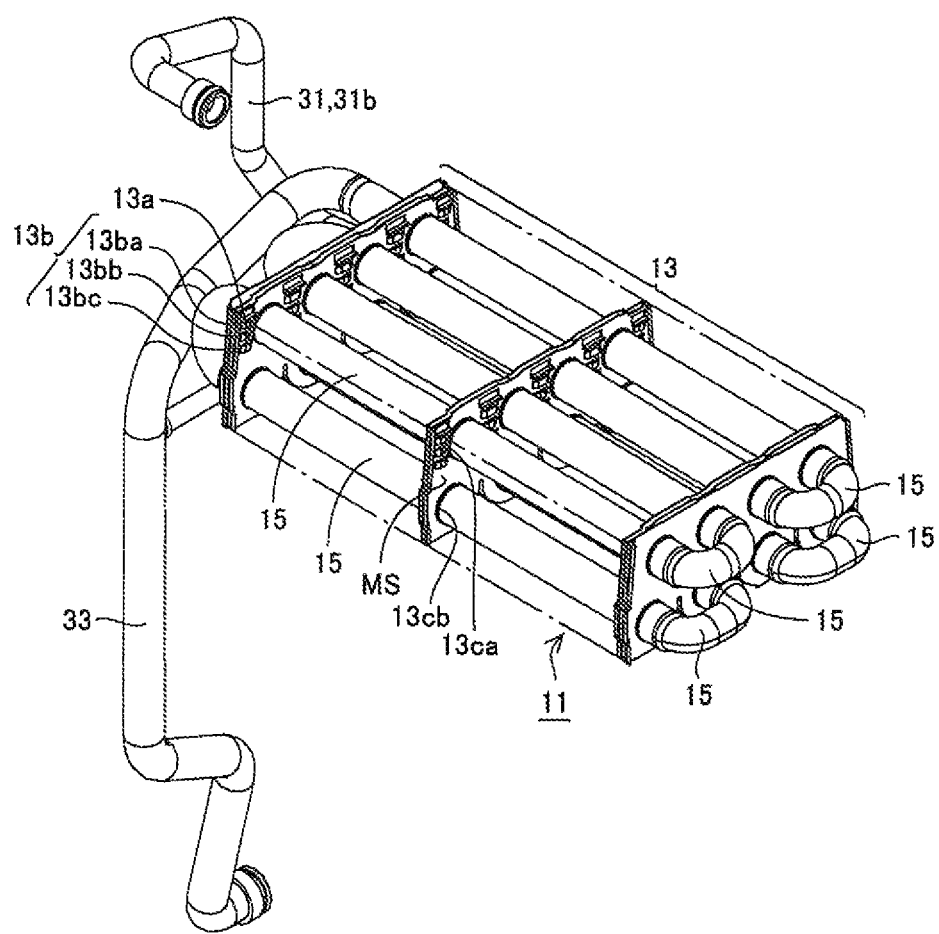
FIG. 4 is a perspective view schematically showing the construction of the primary heat exchanger of the water heater in one embodiment of the present invention.

Referring to FIG. 4, each of the plurality of fins 13 stacked on one another is made of a plate-shaped member and has a plurality of through holes 13ca, 13cb in a main surface MS of the plate-shaped member. Each of the plurality of through holes 13ca, 13cb allows insertion of heat conduction pipe 15 therethrough. Heat conduction pipe 15 is brazed to a circumference of each of the plurality of through holes 13ca, 13cb.

Figure 5:
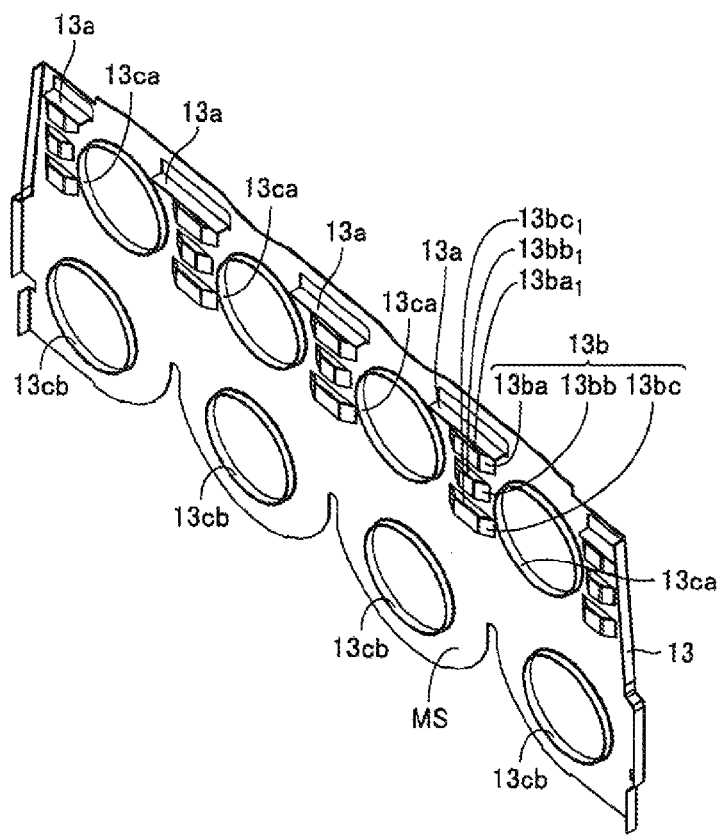
FIG. 5 is a perspective view schematically showing a construction of a fin of the primary heat exchanger in one embodiment of the present invention.

Referring to FIG. 5, each of the plurality of fins 13 has a cut and raised wall portion 13a and a cut and raised slit 13b. Cut and raised wall portion 13a is a portion cut and raised by cutting a part of plate-shaped fin 13 and then bending the part, and it is formed integrally with fin 13.

Cut and raised wall portion 13a has one end portion and the other end portion, and it is constructed by bending, with one end portion being defined as a root side connected to fin 13 and the other end portion being defined as a tip end side protruding toward main surface MS of fin 13. An angle of bending of cut and raised wall portion 13a with respect to main surface MS of fin 13 may be, for example, 90°, or an acute angle, or an obtuse angle.

Cut and raised slit 13b has, for example, three cut and raised slit portions 13ba, 13bb, 13bc. Each of cut and raised slit portions 13ba, 13bb, 13bc is a portion cut and raised by cutting a part of plate-shaped fin 13 and bending the part, and it is formed integrally with fin 13.

Each of cut and raised slit portions 13ba, 13bb, 13bc has one end portion and the other end portion, both of one end portion and the other end portion are connected to fin 13, and each cut and raised slit portion protrudes from main surface MS of fin 13 by being bent between one end portion and the other end portion. Thus, tunnel-shaped holes $13ba_1$, $13bb_1$, $13bc_1$ are formed between one end portions and the other end portions of cut and raised slit portions 13ba, 13bb, 13bc, respectively.

It is noted that the number of cut and raised slit portions included in cut and raised slit 13b is not limited to 3, and 1, 2, or 4 or more cut and raised slit portion(s) may be provided.

Figure 6:
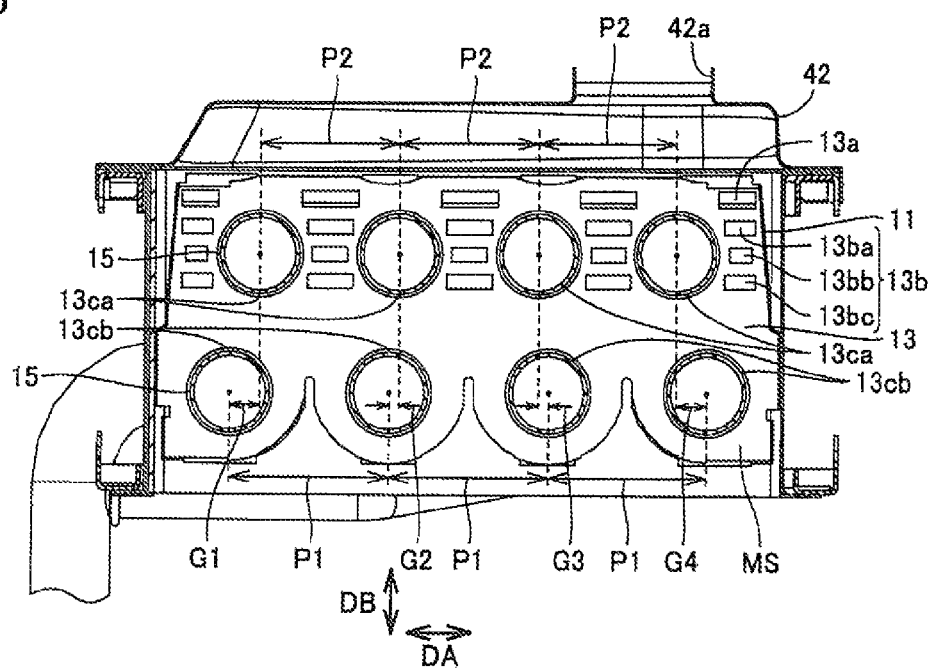
FIG. 6 is a view of the primary heat exchanger in one embodiment of the present invention viewed in a direction orthogonal to a main surface of the fin.

Referring to FIG. 6, a plurality of through holes 13ca, 13cb include a plurality of first-stage through holes 13ca and a plurality of second-stage through holes 13cb. The plurality of first-stage through holes 13ca include, for example, 4 through holes, and the plurality of second-stage through holes 13cb include, for example, 4 through holes.

The plurality of first-stage through holes 13ca are arranged as aligned along a first direction (a direction shown with an arrow DA in the figure) on main surface MS of fin 13. Similarly, the plurality of second-stage through holes 13cb are also arranged as aligned along the first direction (the direction shown with arrow DA in the figure) on main surface MS of fin 13. The first stage constituted of the plurality of first-stage through holes 13ca and the second stage constituted of the plurality of second-stage through holes 13cb are arranged at a distance from each other in a second direction orthogonal to the first direction (a direction shown with an arrow DB in the figure). Namely, the first stage constituted of the plurality of first-stage through holes 13ca and the second stage constituted of the plurality of second-stage through holes 13cb are arranged to be parallel to each other.

Figure 7:
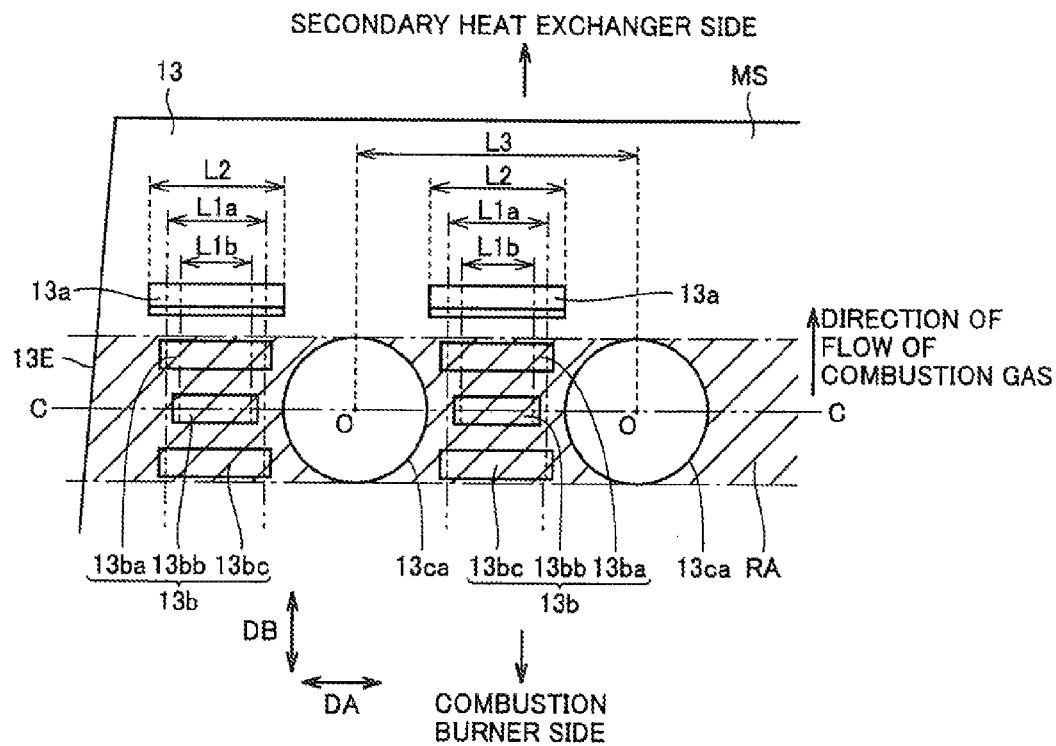
FIG. 7 is a partially enlarged view of FIG. 6.

Referring to FIG. 7, cut and raised slit 13b above is formed in a region adjacent to first-stage through holes 13ca in first direction DA (a hatched region RA in the figure). In the present embodiment, all of three cut and raised slit portions 13ba, 13bb, 13bc included in cut and raised slit 13b are arranged in this region RA.

In the case that cut and raised slit 13b has a plurality of cut and raised slit portions, all of the plurality of cut and raised slit portions do not have to be arranged in this region RA, but at least one of the plurality of cut and raised slit portions should only be arranged in this region RA.

Each of three cut and raised slit portions 13ba, 13bb, 13bc extends like a band along first direction DA from one end portion connected to fin 13 toward the other end portion. Thus, each of the tunnel-shaped holes in three cut and raised slit portions 13ba, 13bb, 13bc extends (passes) in second direction DB.

Cut and raised wall portion 13a is located in second direction DB of cut and raised slit 13b. Specifically, cut and raised wall portion 13a is located on an extension in a direction in which each tunnel-shaped hole in cut and raised slit portions 13*ba*, 13*bb*, 13*bc* extends (passes). This cut and raised wall portion 13*a* is arranged as displaced from a virtual straight line C-C connecting centers O of the plurality of first-stage through holes 13*ca* toward a downstream side (a side of the secondary heat exchanger) in a direction of flow of the combustion gas.

One end portion (the root side) of cut and raised wall portion 13*a* which is connected to fin 13 extends along first direction DA on the main surface of fin 13. In addition, the other end portion (the tip end side) of cut and raised wall portion 13*a* which protrudes from the main surface of fin 13 also extends along first direction DA.

One set of cut and raised wall portion 13*a* and cut and raised slit 13*b* above is arranged between through hole 13*ca* located at an endmost portion among the plurality of first-stage through holes 13*ca* arranged as aligned in first direction DA and an edge 13E of fin 13. In addition, another set of cut and raised wall portion 13*a* and cut and raised slit 13*b* is arranged between two through holes 13*ca* adjacent to each other, among the plurality of first-stage through holes 13*ca* arranged as aligned in first direction DA.

A length L2 by which cut and raised wall portion 13*a* extends in first direction DA is equal to or longer than lengths L1a, L1b by which cut and raised slit portions 13*ba*, 13*bb*, 13*bc* extend in the first direction. In addition, length L2 by which cut and raised wall portion 13*a* extends in first direction DA is equal to or smaller than a hole pitch L3 between the plurality of first-stage through holes 13*ca*. Moreover, length L1b by which cut and raised slit portion 13*bb* in a central portion extends in first direction DA is equal to or smaller than length L1a by which cut and raised slit portions 13*ba*, 13*bc* located on opposing sides respectively extend in first direction DA.

It is noted that, in the present embodiment, cut and raised slit portion 13*bb* located in the center among three cut and raised slit portions 13*ba*, 13*bb*, 13*bc* is located on virtual straight line C-C passing through center O of each through hole 13*ca*.

Figure 12:
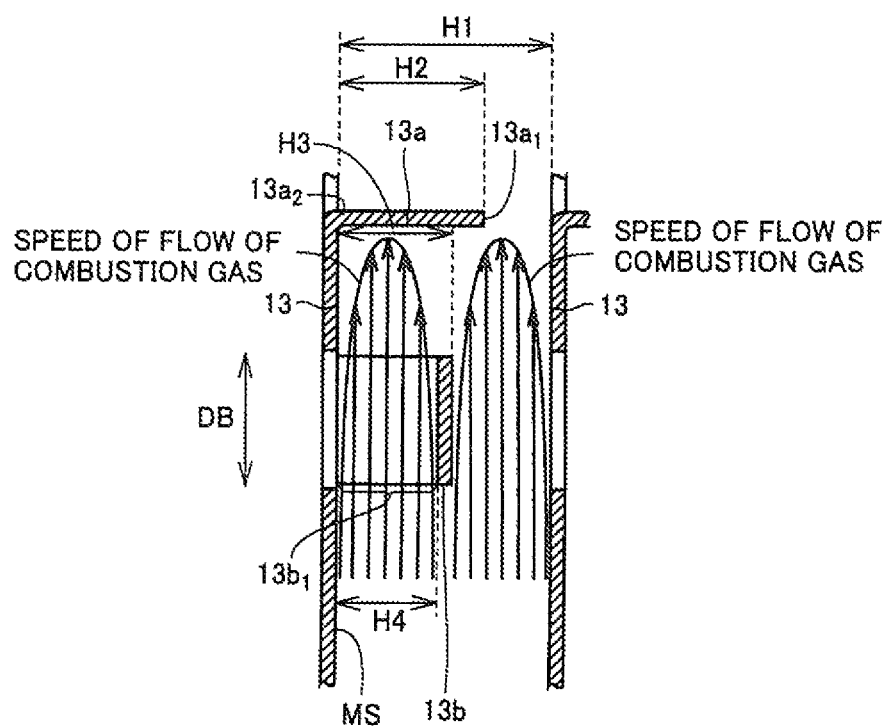
FIG. 12 is a diagram of the stacked fins, showing distribution of speeds of a combustion gas in the case where both of a cut and raised slit and a cut and raised wall portion are provided.

Referring to FIG. 12, a height H2 by which cut and raised wall portion 13*a* protrudes from main surface MS of fin 13 is greater than half a dimension H1 (H1×½) of an interval between fins 13 adjacent to each other among the plurality of stacked fins 13 and smaller than ¾ of dimension H1 above (H1×¾). In addition, height H2 of protrusion of cut and raised wall portion 13*a* is greater than a greatest height H3 by which cut and raised slit 13*b* (cut and raised slit portions 13*ba*, 13*bb*, 13*bc*) protrudes from main surface MS of fin 13.

Dimension H1 of the interval between fins 13 adjacent to each other is, for example, 2.5 mm, height H2 of protrusion of cut and raised wall portion 13*a* is, for example, 1.8 mm, and maximum height H3 of protrusion of cut and raised slit 13*b* is, for example, 1.5 mm.

Referring to FIG. 6, hole pitch P2 between the plurality of first-stage through holes 13*ca* is smaller than hole pitch P1 between the plurality of second-stage through holes 13*cb*. Therefore, the centers of the plurality of first-stage through holes 13*ca* are arranged as displaced by prescribed amounts G1 to G4 in first direction DA from the centers of the plurality of second-stage through holes 13*cb*, respectively.

Heat conduction pipe 15 has a pipe diameter, for example, of 16 mm φ, and each of displacement amounts G1 to G4 of the center of the pipe above is, for example, 1 mm or greater. In addition, preferably, the total of the number of the plurality of first-stage through holes 13*ca* and the number of the plurality of second-stage through holes 13*cb* is an even number. Moreover, the number of the plurality of first-stage through holes 13*ca* is preferably the same as the number of the plurality of second-stage through holes 13*cb*.

An operation of water heater 1 in the present embodiment will now be described.

Referring to FIG. 1, by turning on an operation switch and allowing a prescribed amount of water to flow through water supply pipe 31, the fan of blowing portion 6 starts to revolve, combustion apparatus 3 is ignited, and the combustion gas is sent upward from combustion apparatus 3. Referring to FIG. 3, the sent combustion gas flows in the inside of shell plate 17 where primary heat exchanger 11 is arranged, then flows through secondary heat exchanger 21 via outlet port 42*a* of exhaust collection and guide member 42, and thereafter is exhausted to the outside through exhaust port 27*a*.

Referring to FIG. 1, on the other hand, water fed through water supply pipe 31 initially flows through heat conduction pipe 25 in secondary heat exchanger 21. While water flows through secondary heat exchanger 21, it is preheated by the combustion gas (latent heat). Then, preheated water is sent through pipe 32 to primary heat exchanger 11. Preheated water sent to primary heat exchanger 11 flows through heat conduction pipe 15 in the lower stage (heat conduction pipe 15 which passes through through holes 13*cb* in the second stage) and then flows through heat conduction pipe 15 in the upper stage (heat conduction pipe 15 which passes through through holes 13*ca* in the first stage). While preheated water flows through heat conduction pipe 15, heat is exchanged between water in heat conduction pipe 15 and the combustion gas (sensible heat) which flows through a gap between fins 13, so that preheated water is heated to a prescribed temperature. Hot water heated to a prescribed temperature is sent to the outside of water heater 1 through hot water delivery pipe 33. Thus, water heater 1 can supply hot water at a prescribed temperature.

A function and effect of the present embodiment will now be described in comparison with a first comparative example shown in FIG. 8, a second comparative example shown in FIG. 10, and a third comparative example shown in FIG. 11.

Figure 8:
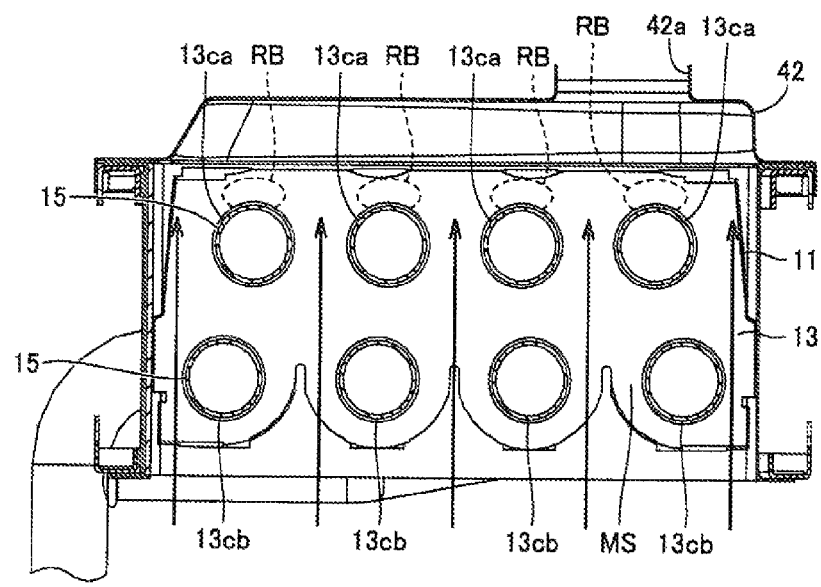
FIG. 8 is a diagram for illustrating the fact that an amount of heat of a combustion gas in a blind spot RB of a heat conduction pipe in a primary heat exchanger cannot sufficiently be conducted to the heat conduction pipe in a first comparative example.

In the first comparative example shown in FIG. 8, a cut and raised wall portion or a cut and raised slit is not formed in main surface MS of fin 13. In this construction, the combustion gas is less likely to flow in a blind spot RB of heat conduction pipe 15 with respect to the flow of the combustion gas in the second direction (the direction shown with arrow DB in the figure). Thus, since an amount of heat of the combustion gas is less likely to be conducted to heat conduction pipe 15 in blind spot RB of heat conduction pipe 15, heat exchanger effectiveness becomes poor.

Figure 9:
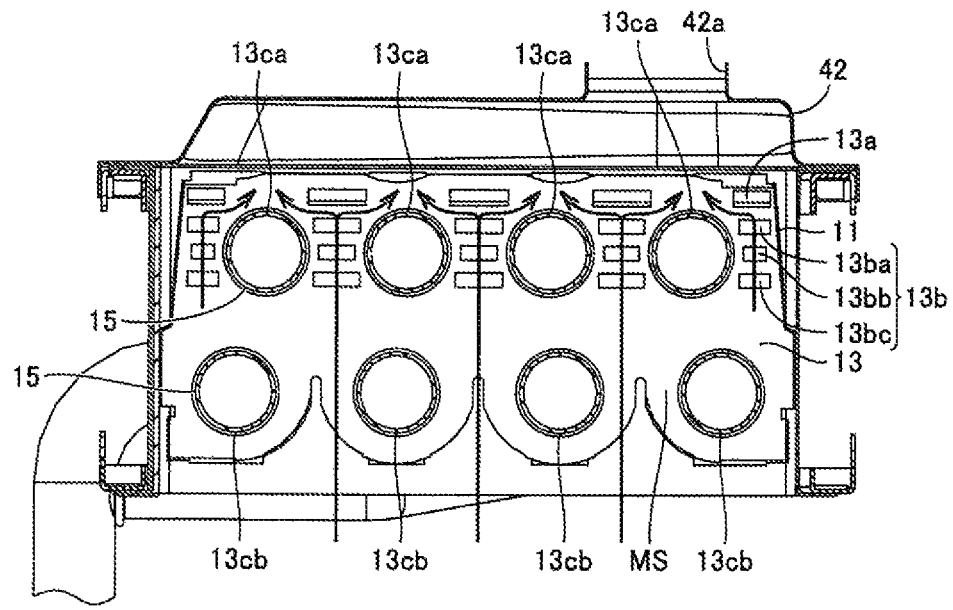
FIG. 9 is a diagram for illustrating the fact that an amount of heat of the combustion gas can sufficiently be conducted to the heat conduction pipe in the blind spot of the heat conduction pipe in the primary heat exchanger in one embodiment of the present invention.

In contrast, in the present embodiment, cut and raised wall portion 13*a* is provided to extend along the first direction (the direction shown with arrow DA in the figure) as shown in FIG. 9. Therefore, the combustion gas which flows along heat conduction pipe 15 collides against this cut and raised wall portion 13*a* and can divert a direction of flow thereof. Thus, the combustion gas can be guided to a blind spot of heat conduction pipe 15 with respect to the flow of the combustion gas, and an amount of heat of the combustion gas can sufficiently be conducted to heat conduction pipe 15 even in a blind spot of heat conduction pipe 15. Thus, heat exchanger effectiveness can be improved.

Figure 10:
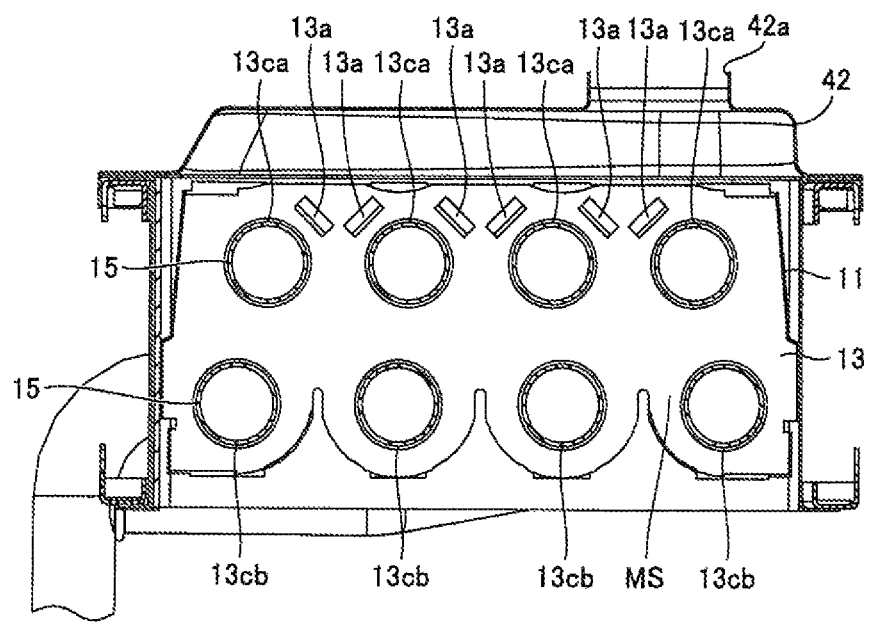
FIG. 10 is a view of a primary heat exchanger in a second comparative example viewed in a direction orthogonal to a main surface of a fin.

It is also possible to provide between two through holes 13*ca*, two cut and raised wall portions 13*a* extending as inclined at angles different from each other, with respect to the first direction, as in the second comparative example shown in FIG. 10. In this construction, however, due to restrictions in terms of working, two cut and raised wall portions 13*a* inclined at angles different from each other cannot be connected to each other as one cut and raised wall portion. Therefore, a gap region where no cut and raised wall portion is formed is created between two cut and raised wall portions 13a inclined at angles different from each other, and the combustion gas flows through this gap region. Therefore, since an amount of heat of the combustion gas which flows through this gap region cannot be conducted to heat conduction pipe 15, heat exchanger effectiveness becomes poor.

In contrast, in the present embodiment, as shown in FIG. 9, one cut and raised wall portion 13a extending along the first direction is provided between two through holes 13ca. Therefore, a gap region between cut and raised wall portions as above is not created and the combustion gas can efficiently be guided to a blind spot of heat conduction pipe 15. Therefore, heat exchanger effectiveness can be improved.

Figure 11:
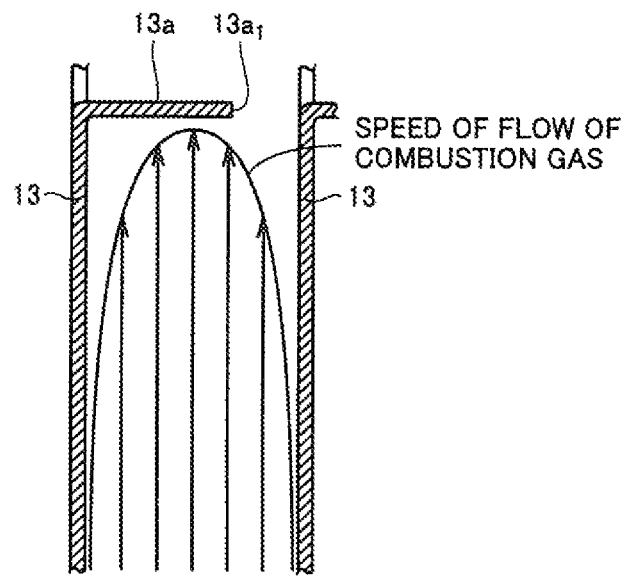
FIG. 11 is a cross-sectional view of stacked fins, showing distribution of speeds of a combustion gas in the case where no cut and raised slit is provided and only a cut and raised wall portion is provided as a third comparative example.

In addition, it is also possible to provide only cut and raised wall portion 13a, without providing a cut and raised slit in fin 13, as in the third comparative example shown in FIG. 11. In this case, a flow of the combustion gas colliding against cut and raised wall portion 13a has a high speed in a central portion between two fins 13 as shown with a curve in the figure and has a low speed at end portions (around fin 13).

Thus, since a flow of the combustion gas in the central portion where a flow speed is fast collides against cut and raised wall portion 13a and the flow is blocked, exhaust resistance of the combustion gas is higher and the combustion gas is less likely to be exhausted from primary heat exchanger 11. When the number of revolutions of the fan of blowing portion 6 (FIGS. 1 and 2) is increased in order to promote exhaust of the combustion gas from primary heat exchanger 11, noise caused by revolution becomes higher.

In contrast, in the present embodiment, cut and raised wall portion 13a is located in second direction DB of cut and raised slit 13b as shown in FIG. 9. Therefore, the combustion gas which flows in second direction DB passes through cut and raised slit 13b before it reaches cut and raised wall portion 13a.

This cut and raised slit 13b has a tunnel-shaped hole $13b_1$ extending in second direction DB as shown in FIG. 12. Therefore, the combustion gas which flows in second direction DB is split into a flow which passes through tunnel-shaped hole $13b_1$ and collides against a root portion $13a_2$ side of cut and raised wall portion 13a and a flow which collides against a tip end portion $13a_1$ side of cut and raised wall portion 13a without passing through tunnel-shaped hole $13b_1$.

Here, both of the flow of the combustion gas which passes through tunnel-shaped hole $13b_1$ and the flow thereof which does not pass through tunnel-shaped hole $13b_1$ have a high speed in a central portion between fin 13 and cut and raised slit 13b and have a low speed at end portions (around fin 13 and around cut and raised slit 13b), as shown with a curve in the figure.

Thus, the central portion where a flow speed is fastest, of the flow of the combustion gas which collides against the root portion $13a_2$ side of cut and raised wall portion 13a collides against cut and raised wall portion 13a, the flow can reliably be guided to a blind spot of the flow of the combustion gas of heat conduction pipe 15.

On the other hand, the central portion where a flow speed is fastest, of the flow which collides against the tip end portion $13a_1$ side of cut and raised wall portion 13a is likely to climb over cut and raised wall portion 13a, and hence exhaust resistance of the combustion gas in primary heat exchanger 11 can be lowered. Since the need for increase in the number of revolutions of blowing portion 6 for supplying air for combustion is thus obviated, higher noise due to increase in the number of revolutions can also be suppressed.

Height H2 of protrusion of cut and raised wall portion 13a is smaller than ¾ of interval H1 (H1×¾) between two fins 13. Therefore, since the central portion where a flow speed is fastest in the flow of the combustion gas which collides against the tip end portion $13a_1$ side of cut and raised wall portion 13a can advance without colliding against cut and raised wall portion 13a, exhaust resistance can further be lowered.

It is noted that height H2 of cut and raised wall portion 13a for the flow in the central portion where a flow speed is fastest in the flow of the combustion gas colliding against the tip end portion $13a_1$ side of cut and raised wall portion 13a not to collide against cut and raised wall portion 13a can be calculated as H2<H3+(H1−H3)/2.

In addition, height H2 of protrusion of cut and raised wall portion 13a is greater than half the interval H1 (H1×½) between two fins 13. Therefore, since the central portion where a flow speed is fastest in the flow of the combustion gas which collides against the root portion $13a_2$ side of cut and raised wall portion 13a reliably collides against cut and raised wall portion 13a, the flow can more reliably be guided to a blind spot of the flow of the combustion gas of heat conduction pipe 15.

It is noted that height H2 of cut and raised wall portion 13a for the flow in the central portion where a flow speed is fastest in the flow of the combustion gas which collides against the root portion $13a_2$ side of cut and raised wall portion 13a to reliably collide against cut and raised wall portion 13a can be calculated as H2>H4/2. This height H4 is a height obtained by subtracting a thickness of cut and raised slit 13b from height H3 (that is, a height of tunnel-shaped hole $13b_1$ in a portion having height H3).

In addition, as shown in FIGS. 6 and 7, in the present embodiment, one set of cut and raised slit 13b and cut and raised wall portion 13a is arranged between edge 13E of fin 13 and through hole 13ca located at an endmost portion among the plurality of first-stage through holes 13ca arranged as aligned in first direction DA. Thus, even at the end portion of primary heat exchanger 11 where stagnation of the flow of the combustion gas is likely, the flow of the combustion gas can be guided to a blind spot of the flow of the combustion gas of heat conduction pipe 15 and thus stagnation of the combustion gas can be suppressed.

Moreover, as shown in FIGS. 6 and 7, in the present embodiment, another set of cut and raised slit 13b and cut and raised wall portion 13a is arranged between two through holes 13ca adjacent to each other, among the plurality of first-stage through holes 13ca arranged as aligned in first direction DA. Thus, the flow of the combustion gas can be guided to a blind spot of heat conduction pipe 15 also between two through holes 13ca adjacent to each other.

Furthermore, as shown in FIG. 7, in the present embodiment, length L2 by which cut and raised wall portion 13a extends in first direction DA is longer than lengths L1a, L1b by which cut and raised slit 13b extends in first direction DA. Thus, the flow of the combustion gas which has passed through cut and raised slit 13b can reliably collide against cut and raised wall portion 13a and guide of the flow of the combustion gas to a blind spot of heat conduction pipe 15 is further facilitated.

In addition, as shown in FIG. 7, in the present embodiment, cut and raised wall portion 13a is arranged as displaced from virtual straight line C-C connecting centers O of the plurality of first-stage through holes 13ca arranged as aligned in first direction DA toward the downstream side in the direction of flow of the combustion gas. Thus, the flow of the combustion gas can more easily be guided to the blind spot of heat conduction pipe 15.

Moreover, as shown in FIG. 6, in the present embodiment, hole pitch P2 between the plurality of first-stage through holes 13ca is smaller than hole pitch P1 between the plurality of second-stage through holes 13cb. Thus, the centers of the plurality of first-stage through holes 13ca can be arranged as displaced by prescribed amounts G1 to G4 in first direction DA from the centers of the plurality of second-stage through holes 13cb, respectively. Therefore, the combustion gas can efficiently be in contact with heat conduction pipe 15 which passes through each of the plurality of first-stage through holes 13ca.

Figure 13:
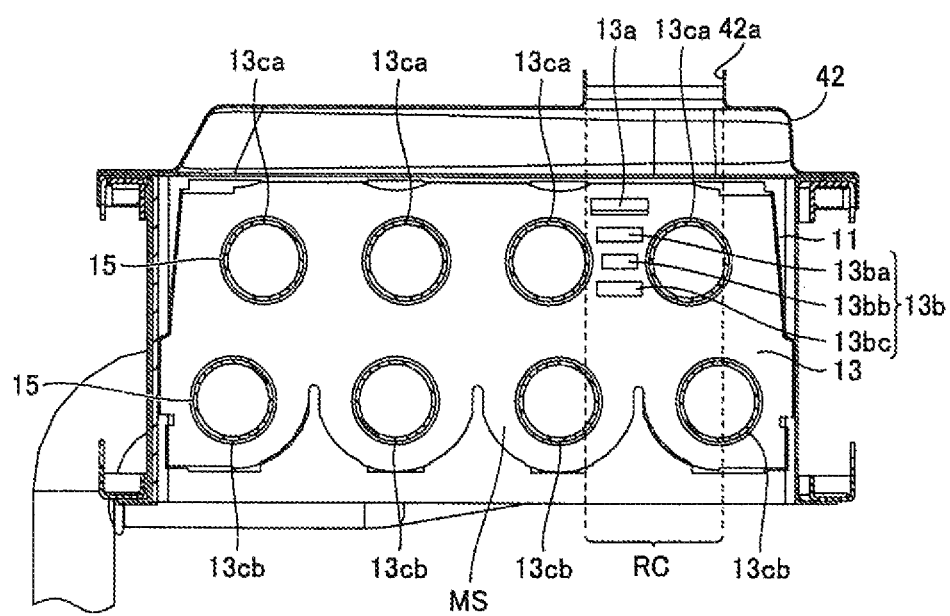
FIG. 13 is a diagram showing such a construction that a cut and raised slit and a cut and raised wall portion are arranged only in a region directly under an exhaust port of an exhaust collection and guide member in the primary heat exchanger in one embodiment of the present invention.

It is noted that, in the present embodiment above, as shown in FIG. 13, cut and raised slit 13b and cut and raised wall portion 13a may be arranged between two through holes 13ca adjacent to each other only in a region RC directly under outlet port 42a of exhaust collection and guide member 42. Namely, cut and raised slit 13b and cut and raised wall portion 13a do not have to be arranged between two through holes 13ca adjacent to each other in a region other than the region directly under outlet port 42a of exhaust collection and guide member 42, so long as it is arranged only within region RC above.

In region RC directly under outlet port 42a of exhaust collection and guide member 42, the combustion gas tends to linearly flow toward outlet port 42a. Therefore, in this region RC, the combustion gas is particularly less likely to flow into a blind spot of heat conduction pipe 15. Therefore, the combustion gas can efficiently be guided to a blind spot of heat conduction pipe 15 by selectively arranging cut and raised slit 13b and cut and raised wall portion 13a in that region RC.

Figure 14:
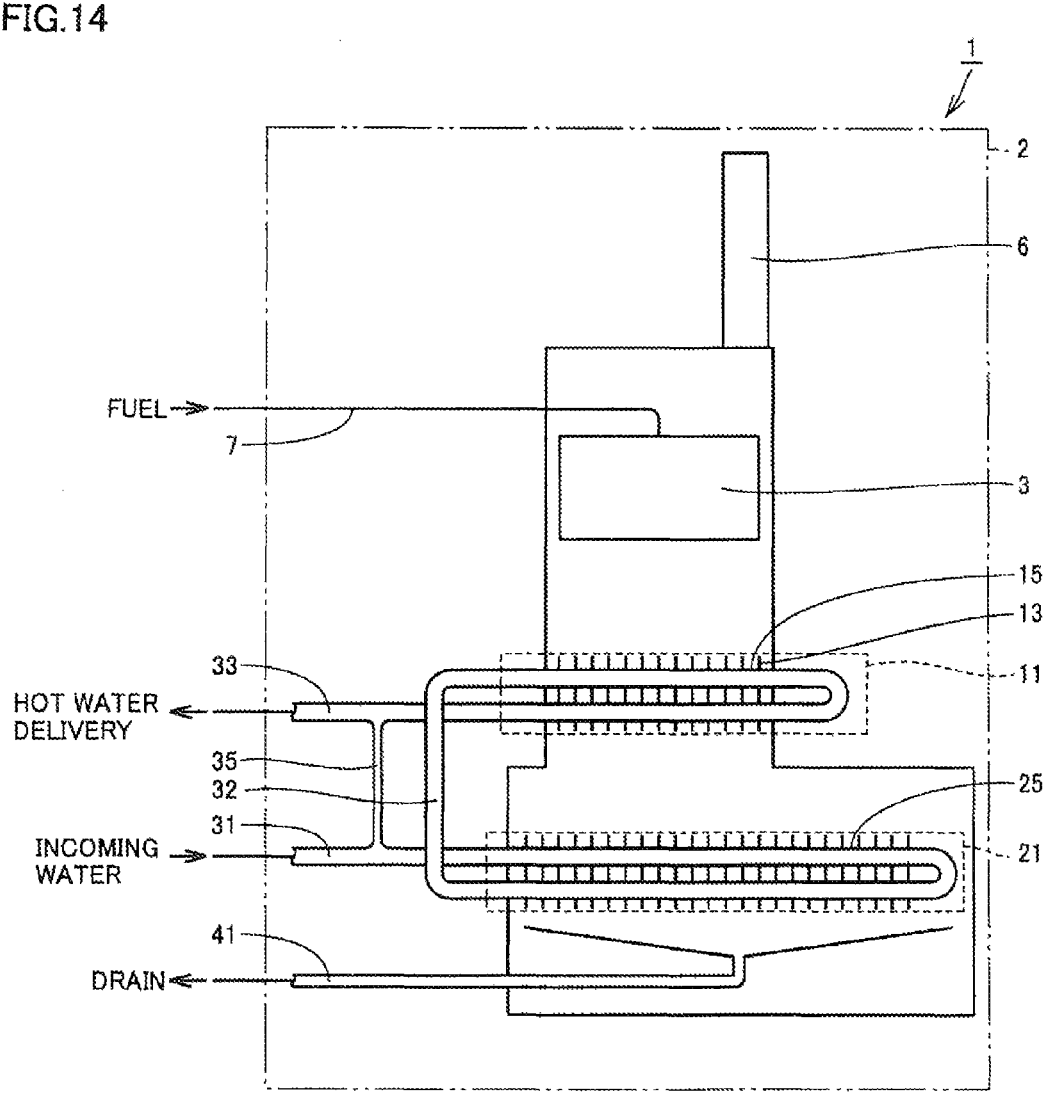
FIG. 14 is a schematic diagram showing a construction in which the primary heat exchanger in one embodiment of the present invention is applied to a water heater using petroleum as fuel.

In addition, in the present embodiment above, a construction where primary and secondary heat exchangers 11, 21 are arranged above combustion apparatus 3 has been described by way of example (see FIGS. 1 and 2), however, primary heat exchanger 11 in the present embodiment may be applied to a water heater using mainly petroleum as fuel. In such a water heater, for example as shown in FIG. 14, primary heat exchanger 11 is arranged below combustion apparatus 3, and secondary heat exchanger 21 is arranged below that primary heat exchanger 11. In a combustion system of this type, blowing portion 6 is arranged above the combustion apparatus, and a fuel pipe 7 is connected to combustion apparatus 3.

It is noted that, since features of water heater 1 in FIG. 14 are otherwise substantially the same as those in water heater 1 shown in FIG. 1, the same elements have the same reference characters allotted and description thereof will not be repeated.

The heat exchanger described above has been described by way of example of arrangement in two stages of a lower stage and an upper stage as arrangement of a heat conduction pipe, however, arrangement in three or more stages may be applicable. As described above, in particular a case of arrangement in two stages can contribute to a more compact primary heat exchanger. A numeric value exemplified as a pipe diameter of and a pitch between heat conduction pipes is by way of example, and limitation thereto is not intended.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A heat exchanger, comprising:
a plurality of fins each having a main surface and a plurality of through holes arranged as aligned along a first direction in said main surface, and arranged as stacked at a distance from one another; and
a heat conduction pipe passing through said plurality of through holes in each of said plurality of fins,
at least one fin among said plurality of fins including
a cut and raised slit formed in a region adjacent to at least one through hole of said plurality of through holes in said first direction and having a tunnel-shaped hole extending in a second direction intersecting said first direction, and
a cut and raised wall portion located in said second direction of said cut and raised slit, protruding from said main surface of said at least one fin, and extending along said first direction, wherein
the cut and raised wall portion has one end portion connected to the at least one fin and the other end portion protruding from the main surface of the at least one fin,
the one end portion, which is connected to the at least one fin, extends along the first direction in said main surface,
said plurality of through holes include a plurality of first-stage through holes arranged as aligned in said first direction and a plurality of second-stage through holes arranged as aligned in said first direction and arranged at a distance from said plurality of first-stage through holes in said second direction,
all of said cut and raised wall portions are arranged to be disposed toward a downstream side in a direction of flow of a combustion gas from a virtual line connecting centers of the plurality of first-stage through holes arranged as aligned in said first direction,
the first-stage through holes are arranged on a downstream side in the direction of flow of the combustion gas from the second-stage through holes, and
the cut and raised wall portion is arranged on only a downstream side in the direction of flow of the combustion gas from the cut and raised slit.

2. The heat exchanger according to claim 1, wherein said cut and raised slit and said cut and raised wall portion are arranged between an edge of said fin and said through hole located at an endmost portion of said plurality of through holes arranged as aligned in said first direction.

3. The heat exchanger according to claim 1, wherein said cut and raised slit and said cut and raised wall portion are arranged between two said through holes adjacent to each other among said plurality of through holes arranged as aligned in said first direction.

4. The heat exchanger according to claim 1, wherein a height of said cut and raised wall portion from said main surface is greater than half a dimension of an interval between two said fins adjacent to each other among said plurality of fins.

5. The heat exchanger according to claim 4, wherein a length of extension of said cut and raised wall portion in said first direction is longer than a length of extension of said cut and raised slit in said first direction.

6. The heat exchanger according to claim 4, wherein a hole pitch between said plurality of first-stage through holes is smaller than a hole pitch between said plurality of second-stage through holes.

7. A water heater, comprising:
said heat exchanger according to claim 4; and
a combustion apparatus for producing a combustion gas to be provided to said heat exchanger.

8. The heat exchanger according to claim 1, wherein
a length of extension of said cut and raised wall portion in said first direction is longer than a length of extension of said cut and raised slit in said first direction.

9. The heat exchanger according to claim 8, wherein
a hole pitch between said plurality of first-stage through holes is smaller than a hole pitch between said plurality of second-stage through holes.

10. A water heater, comprising:
said heat exchanger according to claim 8; and
a combustion apparatus for producing a combustion gas to be provided to said heat exchanger.

11. The heat exchanger according to claim 1, wherein
a hole pitch between said plurality of first-stage through holes is smaller than a hole pitch between said plurality of second-stage through holes.

12. A water heater, comprising:
said heat exchanger according to claim 11; and
a combustion apparatus for producing a combustion gas to be provided to said heat exchanger.

13. A water heater, comprising:
said heat exchanger according to claim 1; and
a combustion apparatus for producing a combustion gas to be provided to said heat exchanger.

14. The water heater according to claim 13, further comprising an exhaust collection and guide member covering said heat exchanger on a side opposite to a side where said combustion apparatus of said heat exchanger is arranged and having an outlet port, wherein
said cut and raised slit and said cut and raised wall portion are arranged between two said through holes adjacent to each other in a region directly under said outlet port of said exhaust collection and guide member and said cut and raised slit and said cut and raised wall portion are not arranged between two said through holes adjacent to each other in a region other than the region directly under said outlet port of said exhaust collection and guide member.

15. A heat exchanger, comprising:
a plurality of fins each having a main surface and a plurality of through holes arranged as aligned along a first direction in said main surface, and arranged as stacked at a distance from one another; and
a heat conduction pipe passing through said plurality of through holes in each of said plurality of fins,
at least one fin among said plurality of fins including
a cut and raised slit formed in a region adjacent to at least one through hole of said plurality of through holes in said first direction and having a tunnel-shaped hole extending in a second direction intersecting said first direction, and
a cut and raised wall portion located in said second direction of said cut and raised slit, protruding from said main surface of said at least one fin, and extending along said first direction, wherein
the cut and raised wall portion has one end portion connected to the at least one fin and the other end portion protruding from the main surface of the at least one fin,
the one end portion, which is connected to the at least one fin, extends along the first direction in said main surface,
said plurality of through holes include a plurality of first-stage through holes arranged as aligned in said first direction and a plurality of second-stage through holes arranged as aligned in said first direction and arranged at a distance from said plurality of first-stage through holes in said second direction,
a hole pitch between said plurality of first-stage through holes is smaller than a hole pitch between said plurality of second-stage through holes, and
the cut and raised wall portion is arranged on only a downstream side in a direction of flow of a combustion gas from the cut and raised slit.

* * * * *